3,689,406
METHOD FOR SEPARATING OILS FROM WATER
Masanori Ohta, 55 Takehana-Nishinokuchi-cho Yamashina, Higashiyama-ku, Kyoto Prefecture, Kyoto, Japan
No Drawing. Filed Dec. 1, 1970, Ser. No. 94,204
Claims priority, application Japan, Dec. 12, 1969, 44/99,381
Int. Cl. B01d 13/00, 17/02
U.S. Cl. 210—23                                           5 Claims

ABSTRACT OF THE DISCLOSURE

Oil is removed from water, e.g., waste water, by means of a fibrous filter composed essentially of a hydrophilic cellulose material such as regenerated cellulose, mercerized cellulose and acetylated cellulose.

---

This invention relates to a method for separating a water-immiscible phase from an aqueous phase and, more particularly, to a method for obtaining oil-free water by removing oils from a mixture of water and oils by means of filtration.

It is well known that waste water from various factories usually contains contaminants such as machine oils, fuel oils and raw oily stocks used for chemical starting materials, the contaminants resulting in pollution of rivers, lakes, etc. Known heretofore as means for removing these oils from waste water is a method wherein waste water is allowed to stand stationarily for forming separate layers and then subjected to decantation or a method wherein oils floating on water are removed by adsorption using a suitable adsorbent. However, the method effectuating stationary separation cannot be applied to the case where discrete particles of oils are dispersed into water to form an emulsion. In such case, it is proposed that the emulsion is once destroyed by either mechanical means such as centrifugal treatment, etc., or chemical means such as addition of a separation-promoting agent, etc., and then the resulting liquid mixture is subjected to stationary separation. However, these methods have some disadvantages; they demand special apparatus and are troublesome in operation, time consuming and expensive. Such disadvantages make these methods unsuited for treating a large amount of waste water. In the field of treating waste water from factories, therefore, there has long been demanded a method for separating oils from water easily in a shorter period of time without expensive cost.

It is an object of this invention to provide a filter which can effectively separate oils from water.

It is another object of this invention to provide a method for separating oils from water by the aid of said filter.

It is still another object of this invention to provide a method preferred for purging waste water from factories by removing oily substances contained therein.

Further objects will become apparent as the following description proceeds.

It has now been found that the above-mentioned objects can be attained by using a filter made of fiber composed essentially of a hydrophilic cellulose selected from the group consisting of regenerated cellulose, mercerized cellulose and acetylated cellulose.

In accordance with this invention, a mixture of water and oils is passed through a filter made of fiber composed essentially of a hydrophilic cellulose selected from the group consisting of regenerated cellulose, mercerized cellulose and acetylated cellulose, whereby water and oil are almost completely separated. In this case, water can be passed through the filter, whereas oils remain on the filter without being passed therethrough.

The regenerated cellulose, which is one of the materials for making the filter used in this invention, can be manufactured by the known viscose process or cuprous ammoniacal process. The regenerated cellulose can be used in the form of unwoven or woven cloth.

The mercerized cellulose can be manufactured according to a known method by treating, for example, cotton cellulose or other plant fibers with a caustic alkali. The acetylated cellulose can be manufactured in a usual manner by treating cotton cellulose with acetic acid. These may be spun, woven and used in the form of cloth or may be processed as in the case of paper-making and used in the form of unwoven cloth. The starting cellulosic material may be previously processed to thread, cloth or unwoven cloth and then treated in a usual manner with an alkali or acetic acid to effect mercerization or acetylation of at least a part of the cellulosic material, instead of being subjected directly to mercerization or acetylation as mentioned above.

The filtering operation in the method of this invention can be carried out using any desired method utilizable for ordinary filtration treatments. For example, a hydrophilic cellulose in the form of filter cloth or filter paper is mounted to the body of a drum or positioned in a support frame through which the liquid to be treated is passed. In this case, subatmospheric or superatmospheric pressure may be applied to increase the passing velocity.

The method of this invention can be applied to a mixture of water and oils in any mixing ratio. The mixture may contain other substances such as inorganic salts, etc.

According to the method of this invention, oils can be separated easily, not only from a mixture forming separate layers, but also from a mixture forming an oil-in-water emulsion. The oils thus separated can be recovered for reuse.

The method of this invention is suitable for the treatment of waste water from industrial establishments as it can be carried out in a simple operation.

This invention will be explained more in detail by the following examples. These examples are given merely by way of explanation and are not intended to limit the scope of this invention. It should be understood that any modification or improvement may be made in this invention so far as it does not depart from the spirit and scope of this invention.

EXAMPLE 1

Cotton fiber subjected in a usual manner to bleaching, exoleation and mercerization was spun and woven to form a thick cloth. The cloth was mounted to a filter press through which an aqueous emulsion containing oils (the diameter of oil droplets was about 0.1 mm.) in an amount of 5,000 p.p.m. was filtered. As the result of measurement, it was found that the quantity of oils contained in the filtrate was only 0.3 p.p.m. and, moreover, the oils were water-soluble ones.

EXAMPLE 2

Commercially available bleached cotton fabrics were treated according to a usual manner with caustic soda to effect mercerization. The hydrophilic cellulose thus obtained was mounted to a filter press as described in Example 1, through which the aqueous emulsion identical with that used in Example 1 was filtered. Oily substances were scarcely found in the filtrate.

EXAMPLE 3

Cellulose triacetate was prepared by treating cotton fiber according to a known manner with acetic anhydride and acetic acid in the presence of concentrated sulfuric acid.

The resulting cellulose triacetate was dissolved into acetone and the dope thus obtained was injected in hot air to form a filament which was then woven to a thick cloth.

This cloth was mounted to a filter press similar to that used in Example 1 and the aqueous emulsion used in Example 1 was filtered therethrough. Oily substances were scarcely found in the filtrate.

EXAMPLE 4

Refined linter was dissolved into Schweitzer's reagent. The solution was filtered, spun into water through a spinneret and passed through a diluted sulfuric acid bath to form a filament which was then cut into staple fibers having a length of about 1–2 cm. A sizing agent was added to the fibers and the mixture was processed, as in the case of paper-making, to an unwoven cloth having a thickness of about 1 mm.

The resultant unwoven cloth was mounted to the same filter press as that used in Example 1 through which a mixture of 10% by weight of light oil and 90% by weight of water was filtered. The light oil was scarcely found in the filtrate. On the other hand, the light oil remaining on the filter cloth was substantially free from water.

What is claimed is:

1. A method for separating oils from water, characterized in that a mixture of oils and water is passed through a filter medium made of a fibrous material consisting essentially of a hydrophilic cellulose selected from the group consisting of regenerated cellulose, mercerized cellulose and acetylated cellulose.

2. A method according to claim 1 wherein a filter cloth which has been made by spinning and weaving a fibrous material consisting essentially of hydrophilic cellulose selected from the group consisting of regenerated cellulose, mercerized cellulose and acetylated cellulose is used as said filter medium.

3. A method according to claim 1 wherein the water is oil-containing waste water, characterized in that waste water from factories which contains oils is treated by passing it through a filter medium made of a fibrous material consisting essentially of hydrophilic cellulose selected from the group consisting of regenerated cellulose, mercerized cellulose and acetylated cellulose, thereby rendering the waste water substantially free from oils.

4. The method of claim 1 wherein said hydrophilic cellulose is mercerized cellulose.

5. The method of claim 1 wherein said hydrophilic cellulose is acetylated cellulose.

References Cited

UNITED STATES PATENTS 3,494,863   2/1970   Greenman _____ 210—41

SAMIH N. ZAHARNA, Primary Examiner

U.S. Cl. X.R.

210—40, Dig. 21